US012242931B2

(12) United States Patent
Kang et al.

(10) Patent No.: US 12,242,931 B2
(45) Date of Patent: Mar. 4, 2025

(54) SYSTEMS AND METHODS FOR SOFT MODEL ASSERTIONS

(71) Applicant: TOYOTA RESEARCH INSTITUTE, INC., Los Altos, CA (US)

(72) Inventors: Daniel D. Kang, Fairfax, VA (US); Nikos Arechiga Gonzalez, Los Altos, CA (US); Sudeep Pillai, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 704 days.

(21) Appl. No.: 17/316,551

(22) Filed: May 10, 2021

(65) Prior Publication Data

US 2022/0358401 A1  Nov. 10, 2022

(51) Int. Cl.
*B60W 60/00* (2020.01)
*G06F 11/07* (2006.01)
*G06N 20/00* (2019.01)

(52) U.S. Cl.
CPC ........... *G06N 20/00* (2019.01); *B60W 60/001* (2020.02); *G06F 11/0706* (2013.01); *G06F 11/0751* (2013.01)

(58) Field of Classification Search
None
See application file for complete search history.

(56) References Cited

U.S. PATENT DOCUMENTS 7,805,266 B1    9/2010  Dasu
11,810,365 B1*  11/2023  Crego ............... G06V 20/58

| 2015/0142457 A1 | 5/2015 | Marshall |
| 2019/0034822 A1 | 1/2019 | Farré Guiu |
| 2020/0272944 A1 | 8/2020 | Goodsitt |

(Continued)

FOREIGN PATENT DOCUMENTS

KR          101895121          9/2018

OTHER PUBLICATIONS

Kang et al., "Model Assertions for Monitoring and Improving ML Models", Mar. 11, 2020, arXiv:2003.01668v3 [cs.AI] Mar. 11, 2020, 16 pages.

(Continued)

*Primary Examiner* — James M McPherson
(74) *Attorney, Agent, or Firm* — SHEPPARD, MULLIN, RICHTER & HAMPTON LLP; Daniel N. Yannuzzi

(57) ABSTRACT

Systems and methods are provided for implementing soft model assertions (SMA) system and techniques designed to monitor and improve Machine Learning (ML) model quality by to detecting errors within the one or more ML models. SMA techniques and systems are distinctly designed to leverage: 1) a user's ability to specify features over data; and 2) large, existing datasets of organizations, in a manner that can improve the accuracy and quality of predicting potential errors in Machine Learning (ML) models. A SMA system can include a controller device receiving predictions generated based on the ML models and output from the SMA system. The controller performs autonomous operations of the system in response to determining that the one or more detected errors within the one or more ML models yield a high certainty of errors in the predictions. The SMA system also includes a domain specific language and a severity score module.

15 Claims, 7 Drawing Sheets

(56) References Cited

U.S. PATENT DOCUMENTS

| | | | |
|---|---|---|---|
| 2021/0125097 A1* | 4/2021 | Ozer | G06F 18/214 |
| 2021/0264438 A1* | 8/2021 | Singh | G06Q 10/20 |
| 2022/0036370 A1* | 2/2022 | Rodman | G06Q 30/016 |

OTHER PUBLICATIONS

Kang et al., "Model Assertions for Debugging Machine Learning", Stanford DAWN Project, NeurIPS MLSys Workshop 2018, pp. 1-9.

* cited by examiner

SYSTEMS AND METHODS FOR SOFT MODEL ASSERTIONS

TECHNICAL FIELD

The present disclosure relates generally to a soft model assertion system and techniques for improved prediction accuracy and sample efficiency by incorporating inductive biases. In particular, some implementations may relate to trajectory and/or behavior prediction for controllers usable in autonomous systems, such as autonomous vehicle control systems.

DESCRIPTION OF RELATED ART

Currently, various Machine learning (ML) techniques and systems are being deployed in complex, real-world scenarios in which errors have impactful consequences. In these ML systems, accuracy of the models is critical. Thus, training models to achieve high accuracy requires two critical tasks: 1) labeling training data accurately; 2) and finding when ML models make errors in new data. Prior work on model assertions allows users to specify when errors may be occurring. Unfortunately, some existing model assertions rely on manual specification of potential errors, which can be complex and may be prone to miss unknown errors.

BRIEF SUMMARY OF THE DISCLOSURE

In accordance with an embodiment of the disclosed technology a soft model assertion (SMA) system is described. The SMA system can monitor one or more Machine Learning (ML) models in order to detect one or more errors within the one or more ML models. Further, a controller device, for example a controller of an autonomous vehicle, can receive predictions generated based on the ML models and output from the SMA system. The controller can perform autonomous operations of the system in response to determining that the one or more detected errors within the one or more ML models yield a high certainty of errors in the predictions.

In accordance with another embodiment of the disclosed technology a soft model assertion method. The method can include generating one or more data associations, where the data associations are based on observations over predictions from one or more machine learning (ML) models. Subsequently, the method can generate one or more priors, generate one or more application objective functions. Then, a severity score can be generated over the one or more priors and the one or more application objective functions. The severity score can be applied for detecting one or more errors within the one or more ML models.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
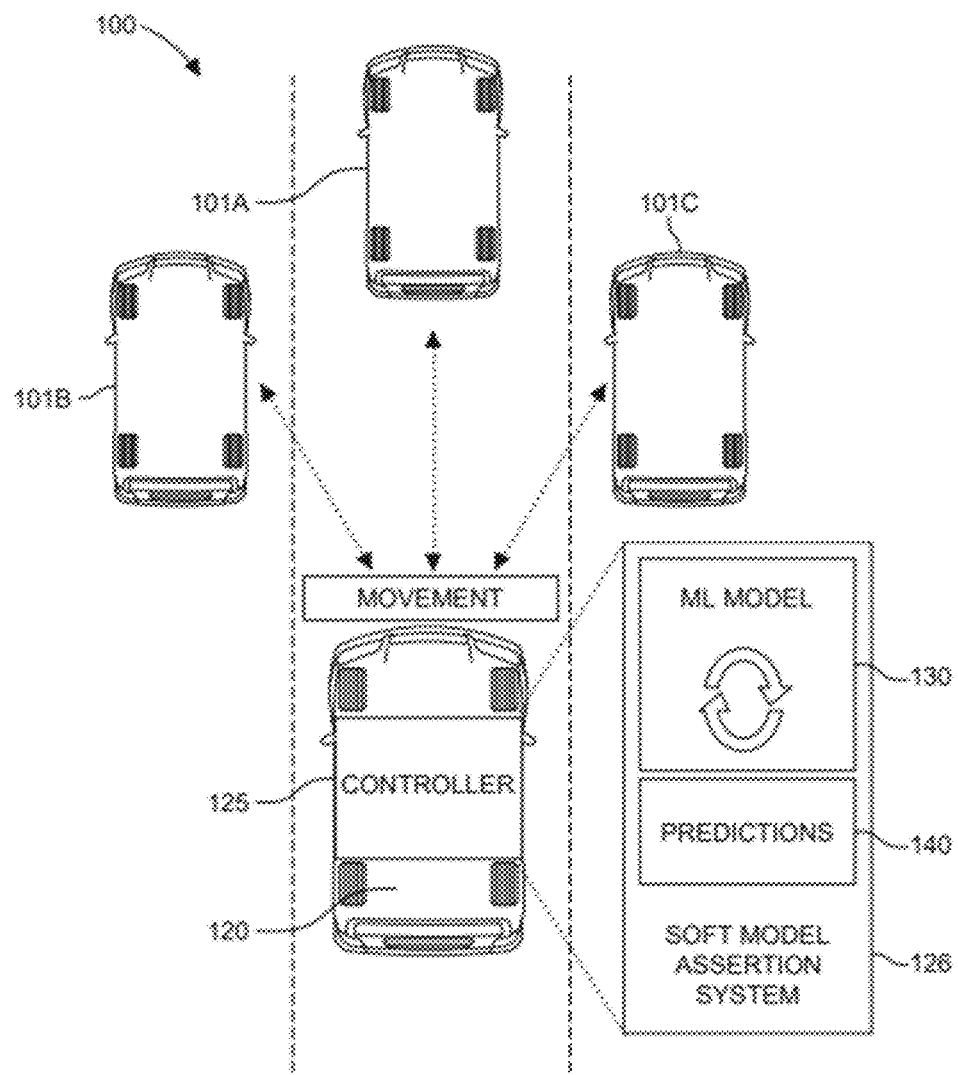
FIG. 1A is an example environment in which a soft model assertion (SMA) system, as implemented in an autonomous vehicle for example, can be implemented within a controller, in accordance with an embodiment of the technology disclosed herein.

The figures are not exhaustive and do not limit the present disclosure to the precise form disclosed.

DETAILED DESCRIPTION

As disclosed herein, the soft model assertion (SMA) system and techniques generally monitors and improves Machine Learning (ML) model quality. SMA techniques and systems are distinctly designed to leverage: 1) a user's ability to specify features over data; and 2) large, existing datasets of organizations, in a manner that can improve the accuracy and quality of predicting potential errors in Machine Learning (ML) models. Given user-provided features (e.g., car velocity) and large existing datasets, SMA techniques involve learning priors that can specify likely and unlikely values (e.g., that 30 mph is likely but 150 mph is unlikely). These priors are subsequently transformed via application objective functions and used to automatically and accurately score training data or model predictions for potential errors. The SMA system and techniques, as described, can therefore provide enhancements over the existing model assertions that rely on manual specification of potential errors.

ML, as disclosed herein, can be considered as an application of artificial intelligence (AI) that provides systems the ability to automatically learn and improve from experience without being explicitly programmed. For example, ML techniques often involve building a model based on sample data, known as "training data" in order to make predictions or decisions. ML focuses on the development of computer programs that can access data and use it to learn for themselves. As ML models are increasingly being deployed to make predictions over unstructured data (e.g., predictions over autonomous vehicle sensing data or text) these predictions are subsequently used to take actions that can have real-world consequences. Particularly in the realm of autonomous vehicles, an inaccurate ML prediction could lead to the catastrophic event of an autonomous vehicles striking pedestrians. As a result, quality and accuracy of ML models is of paramount concern. To address the problem of quality assurance over ML models, recent work has proposed regarding model assertions.

As a general description, Model Assertions (MAs) are black-box functions that can be applied over model inputs and outputs in order to return a continuous severity score that indicates when an ML model may be making an error. For example, a MA may assert that a prediction of a box of a car should not appear and disappear rapidly in a video. Once a set of MAs are specified, the MAs can be used to monitor ML models or collect data.

However, as alluded to above, there are two major challenges in deploying MAs in real-world settings. First, there is a challenge relating to the requirement that users manually specify MAs as user-defined functions. The drawbacks of manually specifying MAs can be further exacerbated for complex ML deployments. Secondly, even if users manually construct the MAs, accurately calibrating severity scores to correctly indicate the severity remains a challenge. Furthermore, ad-hoc methods of specifying severity scores run the risk of ignoring the large amounts of ground-truth labels that organizations collect. Ideally, higher severity scores will indicate a higher chance of error. This is especially important as organizations have limited resources to evaluate potential errors in ML models. These challenges are address by the distinct capabilities of the SMA system and techniques disclosed herein.

In an aspect of SMA, the techniques and system can support an evaluation of DSL and data-driven specification of severity scores in a real-world environment, such as autonomous vehicle labels. FIG. 1A illustrates an example environment 100 in which an autonomous system, shown as autonomous vehicle 120 for example, implements SMAs. SMAs is applicable to various environments in which ML models can be monitored for errors. However, for purposes of discussion, SMA is discussed with respect to vehicles, and namely the autonomous vehicle 120. Thus, it should be appreciated that the SMA techniques and system disclosed can be utilized in various ML-related applications (e.g., not involving control of an autonomous vehicles), including but not limited to: auditing labels for ML models; retraining ML models; and distributing identified errors in ML models to external vendors.

Referring back to the example of FIG. 1A, the autonomous vehicle 120 may include a controller 125 that executes a variety of autonomous driving tasks, such as detecting objects (e.g., vehicles and pedestrians) and tracking lane markings. ML-based techniques can be used to enhance computer-controlled features of vehicles in a manner that improves driving safety (e.g., a reduction of potential crashes), provides uniform traffic flow, and optimizes driving performance of vehicles (e.g., fuel efficiency) for a practical application and/or operation environment, for example environment 100. These autonomous tasks are accomplished by leveraging ML models 130. Generally, the ML models 130 are generated and trained using data that can be obtained from different vehicle sensors, such as visual (e.g., camera), LIDAR, or ultrasound sensors. For example, vehicle 120 may employ a vision model (as one of the ML models 130) to detect objects in video and a point cloud model (as one of the ML models 130) to perform three-dimensional (3D) object detection. However, in some instances, there may be divergence amongst the several ML models 130 and errors made by some of the ML models 130. These errors and inaccuracies in the ML models 130, as previously described, can have extreme consequences (e.g., accidents, vehicle damage, body injury) when affecting the performance of the autonomous driving tasks of the vehicle 120. For example, object detection models can identify boxes of vehicles that may be proximate to the vehicle 120, shown in FIG. 1A as vehicles 101A-101C in adjacent lanes. However, the boxes identifying the vehicles 101A-101C may flicker rapidly in and out of the video, indicating some of the detections of the vehicles 101A-101C generated by the ML models 130 are likely wrong.

In another scenario that may cause errors in the ML models 130, models generated by different sensors may lead to divergence amongst ML models 130 detecting similar information. For example, the vehicle 120 can have LIDAR sensors and camera sensor to generate visual models on the ML models 130. However, sometimes the ML models 130 generated by LIDAR and the ML models generated by camera may disagree. While seemingly simple, similar errors in ML models 130 can lead to catastrophic outcomes in autonomous driving task. For instance, in an extreme case, errors in the ML models 130 can cause the autonomous driving tasks to operate improperly (e.g., not detecting one of the vehicles 101A-101C) leading to the vehicle 120 colliding with a surrounding vehicle. These systematic errors in the ML models 130 can arise for diverse reasons, such as a domain shift between training and deployment data (e.g., still images vs. video), incomplete training data (e.g., no instances of snow-covered cars), and noisy inputs.

Thus, according to the embodiments, the controller 125 can include a SMA system 126 to implement the SMA techniques described herein. To safely and efficiently navigate in complex traffic (e.g., high volume urban areas), autonomous vehicle 120 can employ the SMA system 126 to monitor and improve the quality of ML models 130. As the ML models 130 are improved by the SMA system 126, the predictions 140 in relation to surrounding traffic (vehicles, bicycles, pedestrians, etc.) used to perform the autonomous driving tasks for autonomous vehicle 120 is also improved. The SMA system 126 can employ the described techniques on real-world datasets, for example data capture by autonomous vehicle 120 in operation, in a manner that allows the SMA system 126 to find errors in both proposed human labels and model predictions effectively. The SMA system 126 is described in further detail in reference to FIG. 4.

In the illustrated example, the SMA system 126 applies SMA to finding different kinds of errors in ML models 130. As will be described below, the SMA system 126 can be configured to detect errors including, but not limited to: 1) finding missing labels (or observations) within tracks; 2) finding missing tracks; and 3) finding erroneous ML model predictions. It can be assumed that the predictions 140 include 3D bounding boxes over LIDAR point cloud data, and that the SMA system 126 has access to two priors: an observation prior over box volume and a transition prior over estimated velocity.

Figure 1B:
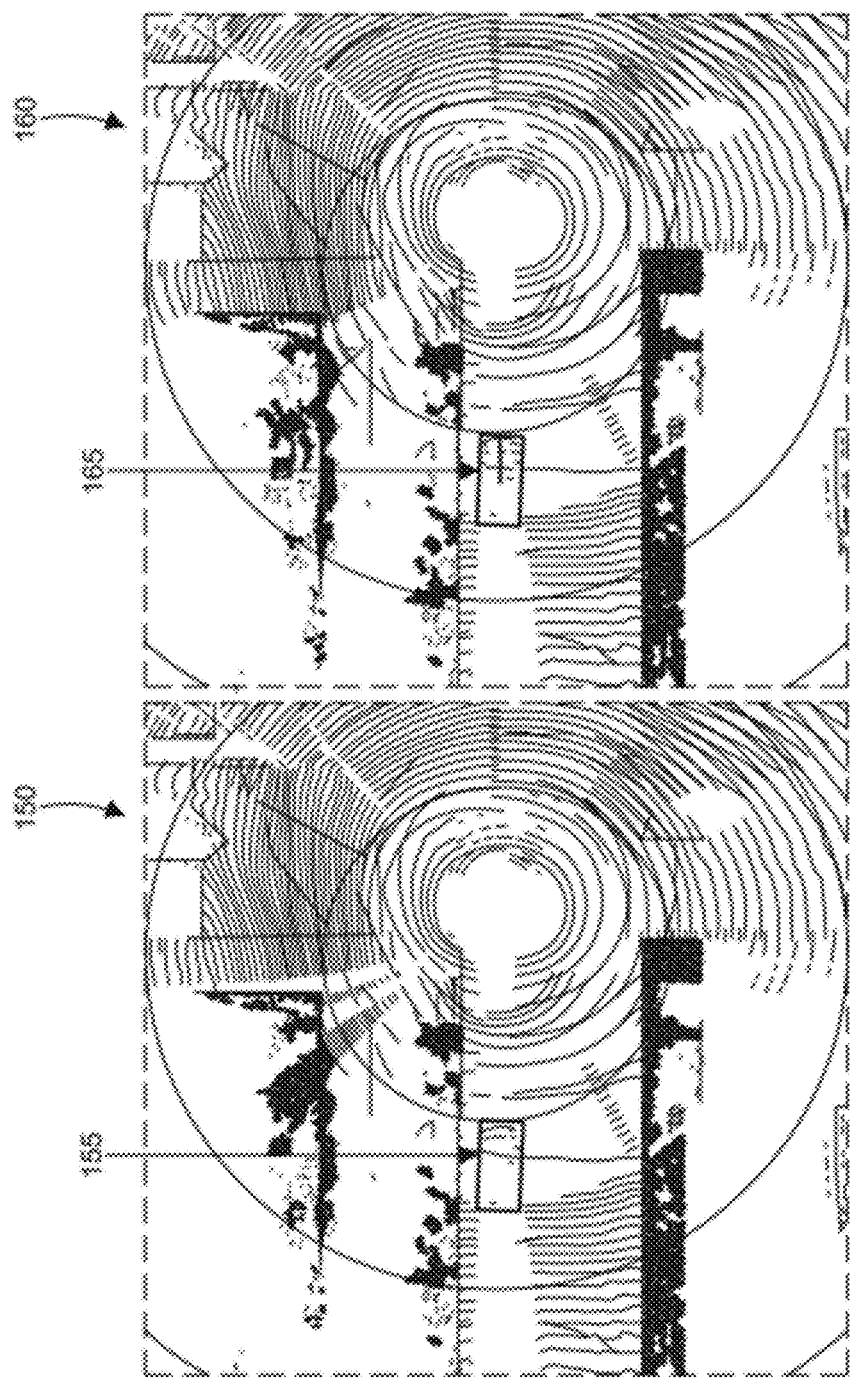
FIG. 1B is an example of an image data that may be analyzed by the SMA system of FIG. 1A to detect an observation missing within a track, in accordance with an embodiment of the technology disclosed herein.

In an example operation, the SMA system 126 can configured to find errors in labels proposed by humans that should belong to an existing track. For example, the LIDAR and cameras can capture a vehicle 101A in front of the autonomous vehicle 120, where the first frame of the captured image is missing the car box. An example of a LIDAR and camera captured images 150 and 160 are shown in FIG. 1B.

As an example, each of the images 150, 160 consists of 150 frames of synchronized LIDAR point cloud data and multiple cameras (e.g., six camera). The data can be recorded at 10 Hz. Further, in the example, multiple label sources (e.g., three label sources) can be used over the LIDAR point cloud data shown in images 150, 160. All label sources predict 3D bounding boxes for objects of interest in the images 150, 160. Classes can describe objects in the scene, such as car, truck, pedestrian, motorcycle, and wheeled slow, for instance. The labeling can be primarily done over the point cloud data, and the camera data was used to confirm labels from the point cloud data. The first label source can be labels which uses human annotators. These labels can be accurate, but still may contain errors. The second label source can be labels proposed by an organization, such as a state-of-the-art LIDAR model developed internally by an autonomous vehicle company. The third label source can include labels audited by expert inhouse auditors. These labels proposed by the auditor can be considered ground truth in this example.

Particularly, image 150 illustrates a first frame of LIDAR data and image 160 illustrates a subsequent frame of the LIDAR data. As a comparison between image 150 and 160, image 150 (e.g., first frame) is missing the car box (e.g., from detecting the vehicle 101A). As seen, there is no box within the 3D bounding box 155. In contrast, image 160 (e.g., subsequent frame) includes the car box (e.g., from detecting the vehicle 101A). As seen, there is a box within the 3D bounding box 165. Accordingly, FIG. 1B illustrates an example of an observation that is missing (i.e., image 160) within a track.

Referring back to FIG. 1A, to find errors that involve finding missing labels (or observations) within tracks, the SMA system 126 can additionally execute a 3D bounding box prediction model over the data. Given predictions 140 resulting from the ML models 130, these predictions and human proposal can be associated in the same frame (e.g., if they have high box overlap). For instance, LIDAR predictions and human predictions are associated by box overlap within the same frame. Predictions within a track can be associated by box overlap by time (as shown in FIG. 1B).

The application object function implemented by the SMA system 126 zeros out the probability of any bundle that contains a human proposal and any track that does not contain any human proposals. The remaining bundles (that do not have score of negative infinity) only contain predictions 140 from ML models 130 and are in tracks that contain at least one human proposal. The remaining bundles are scored, with the intuition that predicted boxes that produce high probability bundles are likely to be correct predictions. FIG. 1B shows an example of a high probability bundle (where there is a high probability that the corresponding model has error(s) related to the missing observation). In other words, in order to find missing labels (or observations) within tracks, the following application objective function can be implemented:
  A. Set an observation in a bundle with a human proposal to 0.
  B. Set the probability of any track without a human proposal to 0.
  C. The bundles receive likelihoods.
  D. Rank the bundles by likelihood.
  E. Bundles with high likelihoods have a high probability that the observation is missing.
  F. Bundles with low likelihood have a low probability that the observation is missing.

Additionally, the SMA system 126 can be configured to find tracks that are missed entirely (e.g., by human proposals). For example, consider a vehicle 101A in a scene that is occluded by the autonomous vehicle 120 in most frames, but is visible in 5 of the frames (0.5 seconds). This is illustrated in FIG. 1C.

Figure 1C:
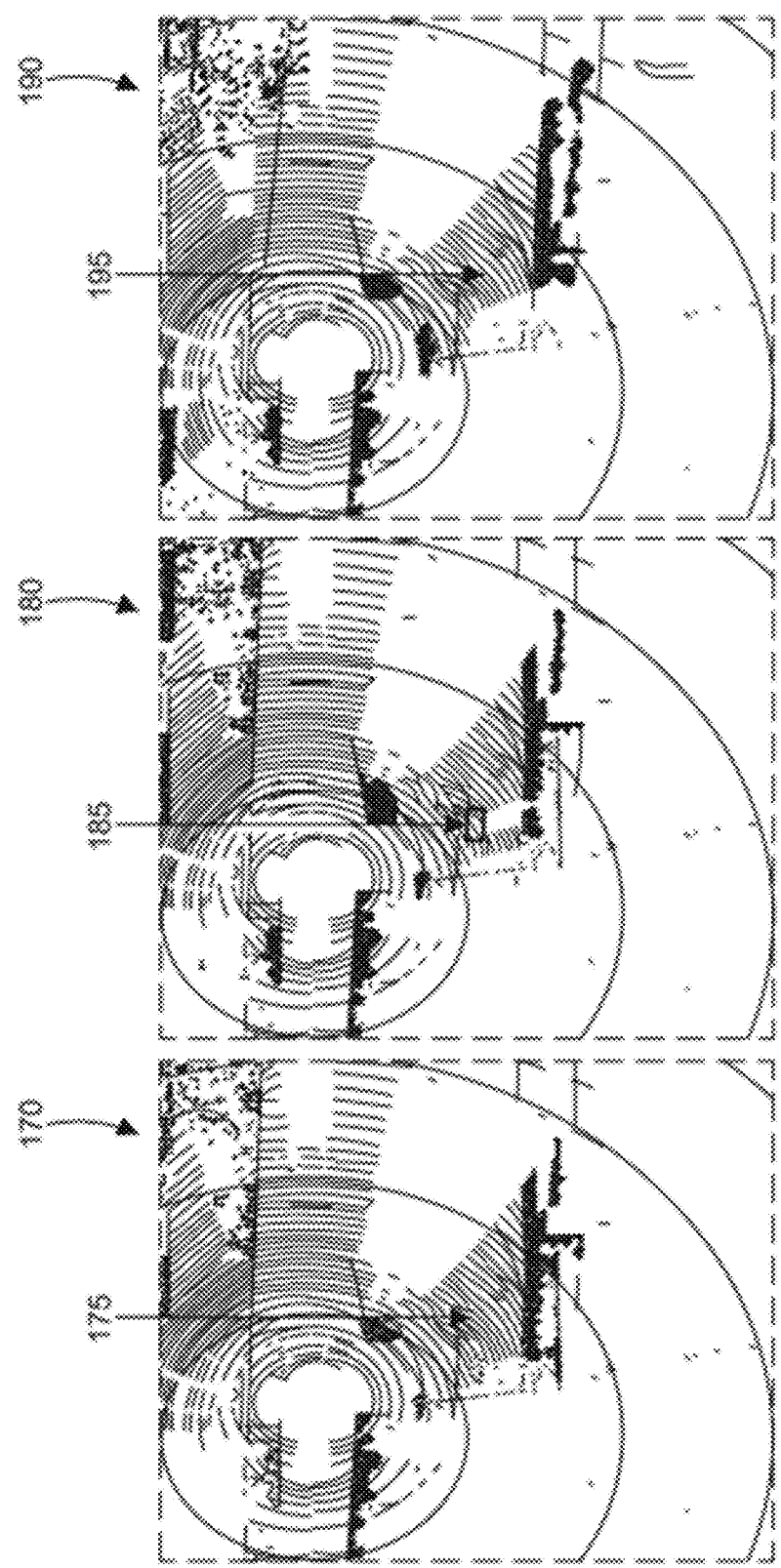
FIG. 1C is an example of an image data that may be analyzed by the SMA system of FIG. 1A to detect a missing track, in accordance with an embodiment of the technology disclosed herein.

Referring now to FIG. 1C, the illustrated example shows images 170, 180, and 190. These images 170, 180, 190 may be captured and represent LIDAR cloud data similar to that described in detail in FIG. 1B. Accordingly, these details are not described again in reference to FIG. 1C. Particularly, in comparing images 170, 180, and 190 the vehicle being missed by human proposals is shown. For instance, as the vehicle is occluded by other vehicles, it only appears for a short period of time (<1 second), which is represented in image 180. In detail, image 180 includes the car box (by detecting the vehicle) in 3D bounding box 185. Conversely, images 170 and 190 include no car box suggesting that the track has been completely missed in the human proposals.

To find such errors relating to missing tracks, the SMA system 126 can execute a 3D bounding box prediction model and association of bundle as described above. The application objective function, as implemented by the SMA system 126, can zero out any track that contains any number of human proposals. The remaining tracks only contain ML model predictions and are scored, with the intuition that consistent predictions from the ML model are likely to be correct. In other words, in order to find tracks that are entirely missed, the following application objective function can be implemented:
  A. Set the probability of any track with a human proposal to 0.
  B. The remainder of the tracks, which only have LIDAR predictions, receive the likelihood.
  C. Consistent LIDAR predictions have a high probability that the track is missing.
  D. Inconsistent LIDAR predictions have a low probability that the track is missing (e.g., spurious predictions).

Further, the SMA system 126 can be configured to find errors in the ML model predictions. To find such errors, it can be generally assume that there are no human proposals. For example, the SMA system 126 can configured to find erroneous tracks only in ML model predictions. In this case, the application objective function inverts the probability of each prior, with the goal of inverting the ranking of the tracks that are likely to be correct and the tracks that are likely to be incorrect.

FIG. 1A generally illustrates a vehicle 120 traveling on a roadway, where vehicle 120 is shown to include SMA capabilities implemented by the SMA system 126 portion of the controller 125. For example, the vehicle 120 can utilize multiple vehicle sensors (e.g., cameras) to passively collect data relating to the surrounding environment and movement of agents on the roadway, which can be used to train ML models 130. It should be appreciated that some portions of training and/or tuning the ML models 130 can be considered an aspect of pre-process. For instance, that the ML models 130 can be tuned "offline" (prior to being used) in addition to be being tuned in operational real-time (e.g., on the vehicle).

In operation, the autonomous vehicle 102 can use the SMA system 126 to detect errors in predictions 140 generated from the ML models 130. For instance, predictions 140 relating to the detection and/or trajectory of each of the proximate vehicles 101A-101C. The prediction 140 can indicate that one of the vehicles, for example vehicle 101C is moving right away from vehicle 120, for example. However, the SMA system 126 can detect that there is error in this predict 140. Based on the vehicle's 101C current movements, the car is actually changing lanes in a manner that may potentially obstruct and/or collide with vehicle 120. Accordingly, based on the SMA system 126 detecting that there is substantial error in the prediction 140, the controller 125 can specifically guide the vehicle 120 to achieve safe maneuvering, namely to avoid collision. As an example, the controller 125 can activate one or more automatic actions of vehicle 120 in response to monitoring of the ML models 130 by the SMA system 126, such as engaging a brake, swerving, adjusting speed, and the like, in order to avoid colliding into other vehicles 101A-101C that may be currently sharing the roadway and proximately located to vehicle 120. In another embodiment, the controller 125 may not effectuate autonomous maneuvering of the vehicle 120. As an example, in response to the SMA system 126 determining that an errors in the prediction 140 may impact safety, the controller 125 can generate an alert to the driver to take action manually.

In some embodiments, the SMA capabilities are implemented as an operational mode for vehicle 120. That is, a driver of vehicle 120 may be able to selectively activate or deactivate a SMA system 126 as desired. For the purposes of discussion, vehicle 120 is described in reference to FIG. 1A having the SMA system 126 (SMA mode) activated, thereby enabling it to perform the safety-aware autonomous maneuvering techniques. As used herein, a "vehicle" is any form of motorized transport. In the illustrated example, vehicle 120 and the plurality of nearby vehicles 101A-101C are automobiles. For purposes of illustration, the embodiments will be described here with respect to automobiles. However, it should be appreciated that the SMA techniques disclosed herein are not limited to automobiles. The systems and methods disclosed herein may be implemented with any of a number of different vehicles and vehicle types. For example, the soft model assertion systems and methods disclosed herein may be used with automobiles, trucks, motorcycles, boats, recreational vehicles and other like on-or off-road vehicles. In addition, the principals disclosed herein may also extend to other vehicle types as well. Moreover, the systems and methods disclosed herein may be implemented in realms involving ML that are outside of vehicles, such as video analytics, medical classifications, and the like.

According to an embodiment, vehicle 120 can be an autonomous vehicle. As used herein, "autonomous vehicle" means a vehicle that configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, where each more correspondingly responds to the controller 125 with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, the safety-aware AI techniques and response can be highly, or fully, automated. For example, the controller 125 can be configured to communicate controls so as to operate the vehicle 120 autonomously and safely. After the controller 125 communicates a safety control to the vehicle 120 operating as an autonomous vehicle, the vehicle 120 can automatically perform the necessary adjustments (e.g., accelerating or decelerating) with no human driver interaction. Accordingly, vehicle 120 can operate with respect to the safety constraints 127 in a fully autonomous manner.

Alternatively, or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g. by depressing the brake pedal to reduce the speed of the vehicle), the adaptive cruise control system is deactivated, and the speed of the vehicle is reduced. Thus, with vehicle 120 operating as a semi-autonomous vehicle, the SMA techniques and response can be partially automated. In an example, the controller 125 communicates a newly generated (or updated) control to the vehicle 120 operating as a semi-autonomous vehicle, under adaptive cruise control features. The vehicle 120 can automatically perform the some of the necessary adjustments (e.g., accelerating) with no human driver interaction. Alternatively, the vehicle 120 may notify a driver that driver input is necessary in response to a new (or updated) safety control. For instance, upon detecting a predicted trajectory that impacts safety, such as potential collision (e.g., close proximity to another vehicle 101A-101C), vehicle 120 may be reduce the speed to ensure that the driver is travelling cautiously. In response, vehicle 120 can present a notification in its dashboard display that reduced speed is required, because of the safety constraints. The notification allows time for the driver to press the brake pedal and decelerate the vehicle 120 to travel at a speed that is safe.

Figure 2:
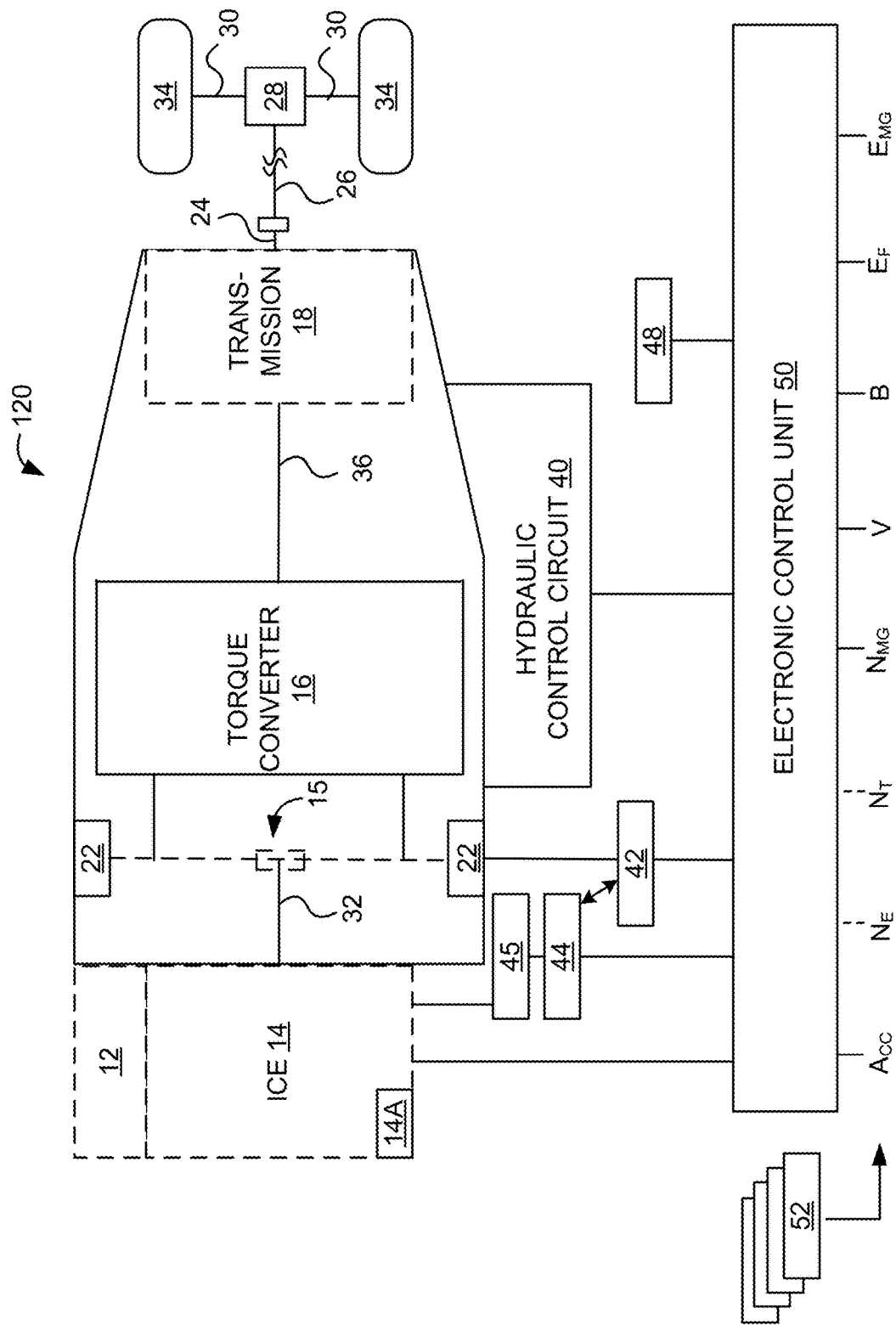
FIG. 2 is a schematic representation of an example vehicle with which embodiments of the SMA systems and methods disclosed herein may be implemented.

An example vehicle in which embodiments of the disclosed technology may be implemented is illustrated in FIG. 2. Although the example described with reference to FIG. 2 is a type of vehicle, the systems and methods for soft model assertion can be implemented in other types of vehicle including gasoline- or diesel-powered vehicles, fuel-cell vehicles, electric vehicles, or other vehicles.

FIG. 2 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 120 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 2, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 3:
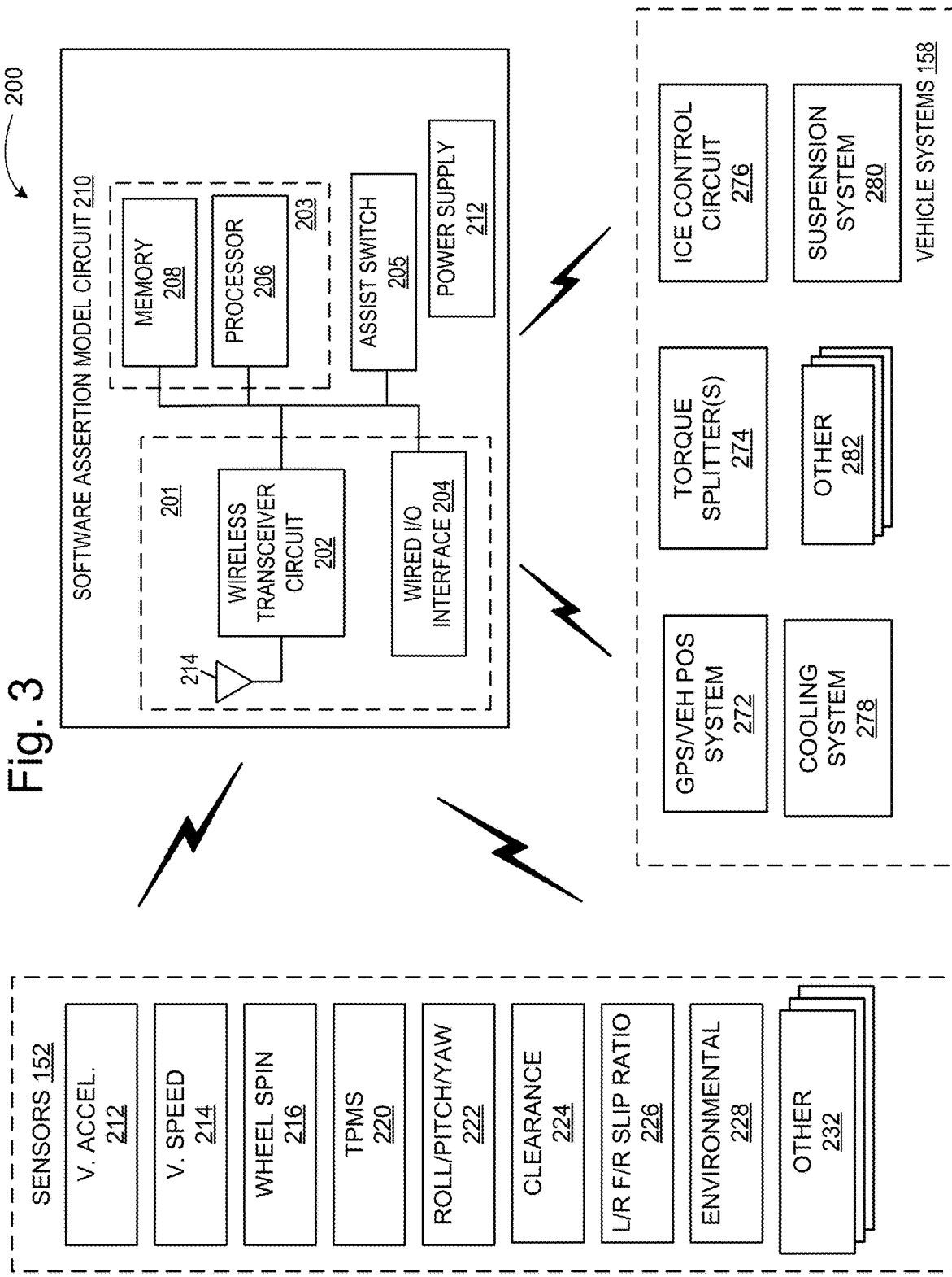
FIG. 3 illustrates an example architecture for a SMA control mode in accordance with one embodiment of the systems and methods described herein.

FIG. 3 illustrates an example architecture for a soft model assertion in accordance with one embodiment of the systems and methods described herein. Referring now to FIG. 3, in this example, control system 200 includes a soft model assertion circuit 210, a plurality of sensors 152, and a plurality of vehicle systems 158. Sensors 152 and vehicle systems 158 can communicate with soft model assertion circuit 210 via a wired or wireless communication interface. Although sensors 152 and vehicle systems 158 are depicted as communicating with the soft model assertion circuit 210, they can also communicate with each other as well as with other vehicle systems. Soft model assertion circuit 210 can be implemented as an ECU or as part of an ECU such as, for example electronic control unit 50. In other embodiments, soft model assertion circuit 210 can be implemented independently of the ECU.

Soft model assertion circuit 210 in this example includes a communication circuit 201, a decision circuit (including a processor 206 and memory 208 in this example) and a power supply 212. Components of the soft model assertion circuit 210 are illustrated as communicating with each other via a data bus, although other communication in interfaces can be included. Soft model assertion circuit 210 in this example also includes a switch 205 that can be operated by the user to manually select the mode, enabling the disclosed operations in a vehicle.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to the soft model assertion circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a soft model assertion circuit 210.

Communication circuit 201 either or both a wireless transceiver circuit 202 with an associated antenna 214 and a wired I/O interface 204 with an associated hardwired data port (not illustrated). As this example illustrates, communications with safety-aware AI circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by soft model assertion circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 2. Sensors 152 can include additional sensors that may or may not otherwise be included on a standard vehicle with which the safety-aware AI system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of safety-aware AI system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, soft model assertion circuit 210 can receive information from various vehicle sensors 152 to determine whether a safety control (based on the safety properties for operation) should be enabled. Also, the driver may manually activate a safety-aware AI control mode by operating switch 205. Communication circuit 201 can be used to transmit and receive information between safety-aware AI circuit 210 and sensors 152, and safety-aware AI circuit 210 and vehicle systems 158. Also, sensors 152 may communicate with vehicle systems 158 directly or indirectly (e.g., via communication circuit 201 or otherwise).

Figure 4:
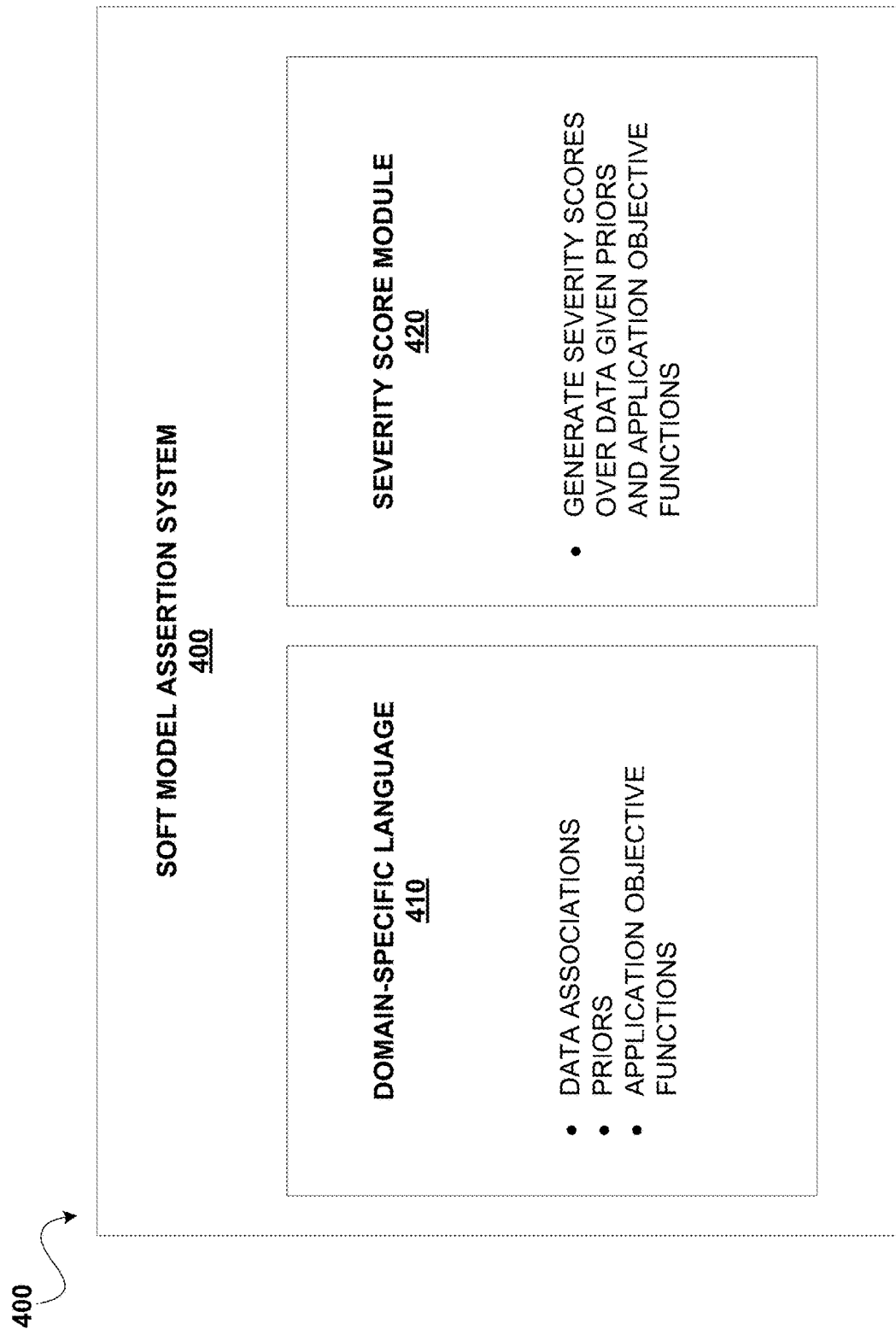
FIG. 4 depicts an example architecture of the SMA system, in accordance with one embodiment.

FIG. 4 shows an example configuration of a SMA system 400 implementing the aforementioned techniques and functions associated with SMA as disclosed herein. In the example, the SMA system 400 includes two primary components, namely the probabilistic domain specific language (DSL) 410, and the severity score module 420. The SMA system 400 (and components 410, 420) can be implemented as hardware (e.g., computer processors, controllers, or circuitry), software (e.g., computer logic, instructions, software applications, firmware), or a combination of thereof. To address these aforementioned challenges related to MAs, the disclosed SMA system 400 implements a language for specifying MAs for data-driven specification of severity scores that leverage existing ground-truth data that organizations collect. As shown, the SMA system 400 include a probabilistic domain-specific language (DSL) 410 for specifying MAs. In detail, the DSL can contains three major components: 1) data associations; 2) priors; and 3) application objective functions. This DSL can be used to specify model assertions without ad-hoc code nor ad-hoc severity scores.

The base data unit in the DSL are observations over sensors, e.g., ML model predictions or human-proposed labels. The observations can be associated within a given time step in observation bundles (e.g., predictions from different ML models) or across time in tracks (e.g., predictions of the same object across time). Enabled by the DSL 410 the data-driven severity score module 420 can be implemented.

A key feature of the disclosed SMA system and techniques is the capability to automatically produce severity scores over data given priors and application objective functions. This capability is implemented by the severity score module 420. Priors take observations, observation bundles, or adjacent pairs of observations within a track and output a probability of seeing some transformation of the input. For example, a prior might take a 3D bounding box of a car and return the likelihood of seeing the box volume. Given these priors, application objective functions transform likelihoods for the specific application at hand. For example, if there is an objective to find likely tracks, the application objective function may be the identity. Alternatively, if the objective is to find unlikely tracks, the application objective function may invert the probability.

Thus, an important aspect of DSL are the priors over observations. Also, specifying priors manually can be challenging. To address this challenge, the SMA techniques include methods of learning empirical distributions over observations. In particular, the fact that many ML organizations collect ground-truth data as part of their ML deployment pipelines are leveraged. This ground truth data, (depends on exact results) may be given between observations of the same object in a single time step. For example, consider the assumption that observation within bundles should agree on object class. To specify this, a user could provide a transformation that returns 0 if all the classes agree and 1 otherwise. The prior would then learn the Bernoulli probability of the class agreement between observation types. SMA's third prior type are priors between observations or bundles in adjacent time steps within a track. These priors are typically used to specify information over time dependent quantities or consistency. For example, a transformation could specify the estimated velocity by box center offset.

Learning priors is another aspect of the disclosed SMA techniques. Given the specifications of the transformations, SMA can automatically fit priors over existing training datasets. In order to fit priors, SMA can take a function that accepts a list of scalars/vectors and returns a fitted distribution. By default, SMA uses a kernel density estimator (KDE) to learn priors over the transformed data. In some cases, other types of distributions are appropriate (e.g., discrete distributions). To learn priors given a set of scenes, SMA can first execute an exhaustive set of transformations over the data and collects the scalar or vector values. Then, for each prior, SMA executes the fitting function over the collected scalar/vector values.

The SMA can also include application objective functions. Application objective functions can wrap data priors to transform them into an application-specific probability. Common operations involve taking the inverse and setting the probability to 0/1 under certain conditions.

Another aspect of SMA includes scoring relative probability. The scoring can consider various priors, such as data priors, joint observation priors, and transition priors. Given a set of application priors, the application-specific score can be represented mathematically as:

$$\ln(\pi \text{Application Priors})$$

The product can be taken over a single observation, observation bundle, or track. This score is the log likelihood of the given observation, observation bundle, or track. Thus, according to the disclosed embodiments, the severity score module 420 can output a severity score that can be further used to ultimately determine errors in ML models in an automatic and accurate manner.

Figure 5:
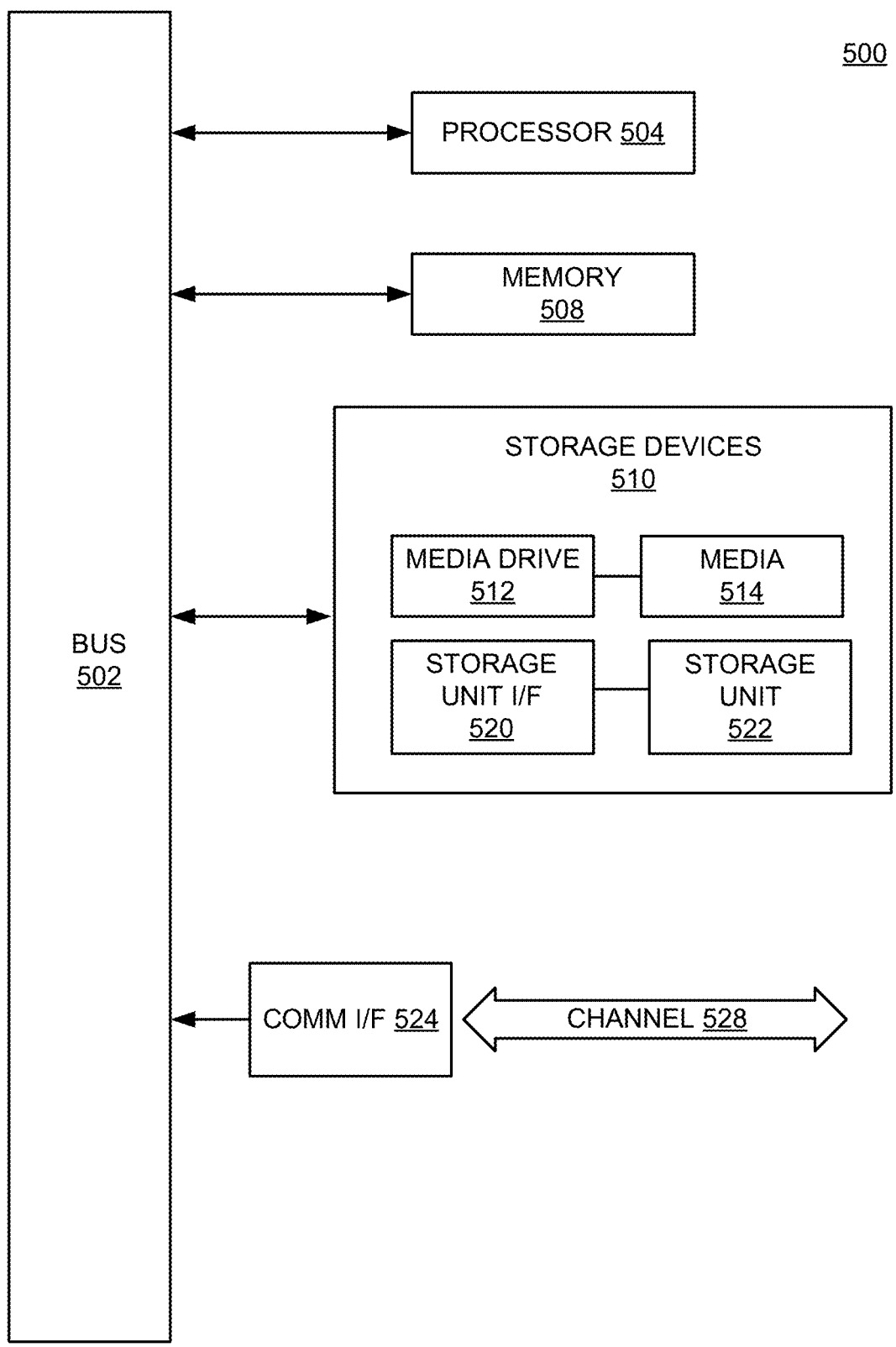
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a model assertion system monitoring one or more Machine Learning (ML) models to generate a severity score for each of the one or more ML models to indicate a type of error in a prediction of the ML model; and
a controller device receiving predictions generated based on the one or more ML models and the severity scores output from the model assertion system, and determining whether to perform autonomous operations of the system based on the severity score for each of the one or more ML models, wherein the autonomous operations are performed in response to the severity scores that indicate a type of error above a threshold level of certainty and comprise autonomously executing an evasive maneuver of a vehicle that corresponds to the severity score of each of the one or more ML models.

2. The system of claim 1, wherein the system comprises an autonomous vehicle.

3. The system of claim 2, wherein the one or more ML models relate to sensors on the autonomous vehicle detecting presence and movement of at least one other vehicle.

4. The system of claim 3, wherein the type of error detected within the one or more ML models comprises a missing observation within a track.

5. The system of claim 4, wherein the type of error detected within the one or more ML models comprises a missing track.

6. The system of claim 1, wherein the type of error detected within the one or more ML models comprises errors in the prediction generated based on the one or more ML models.

7. The system of claim 3, wherein the model assertion system comprises:
a domain specific language; and
a severity score module.

8. The system of claim 7, wherein the domain specific language automatically specifies ML model assertions without ad-hoc code.

9. The system of claim 8, wherein the domain specific language comprises a base data unit of observations over the sensors on the autonomous vehicle.

10. The system of claim 9, wherein the observations comprise predictions generated based on the one or more ML models or human-proposed labels.

11. The system of claim 10, wherein the observations are associated within a given time step in observation bundles or associated across time in tracks.

12. The system of claim 11, wherein a severity score module generates a severity score associated with the observation bundles to detect an error relating to a missing observation within a given time step.

13. The system of claim 12, wherein a severity score of a determined value indicates an error relating to a missing observation.

14. The system of claim 11, wherein the severity score module generates a severity score associated with the tracks to detect an error relating to a missing track across times.

15. The system of claim 14, wherein a severity score of a determined value indicates an error relating to a missing track.

* * * * *